W. LIERFELD.
APPARATUS FOR DRYING SUBSTANCES.
APPLICATION FILED DEC. 5, 1911.

1,061,762.   Patented May 13, 1913.

WITNESSES

INVENTOR
Walther Lierfeld.
By  Attorney

UNITED STATES PATENT OFFICE.

WALTHER LIERFELD, OF DORTMUND, GERMANY.

APPARATUS FOR DRYING SUBSTANCES.

1,061,762. Specification of Letters Patent. Patented May 13, 1913.

Original application filed March 8, 1911, Serial No. 613,055. Divided and this application filed December 5, 1911. Serial No. 664,057.

*To all whom it may concern:*

Be it known that I, WALTHER LIERFELD, a subject of the Emperor of Germany, residing at Dortmund, Kingdom of Prussia, Germany, have invented new and useful Improvements in Apparatus for Drying Substances, of which the following is a specification.

This invention relates to improvements in apparatus for drying substances and is a divisional case from my co-pending application filed March 8, 1911, Number 613,055.

The invention relates to that class of apparatus in which the substance to be dried is delivered into a drum, usually in the form of a cylindrical rotary shell, and wherein the shell is provided with a plurality of inwardly directed shelves on which the material is caught, during rotation, and subsequently released and allowed to descend into the shell to be subdivided and disbursed in such a manner as to facilitate a thorough drying of the same.

My invention will be more fully described in connection with the accompanying drawing and will be more fully set forth in the appended claims.

Figure 1:
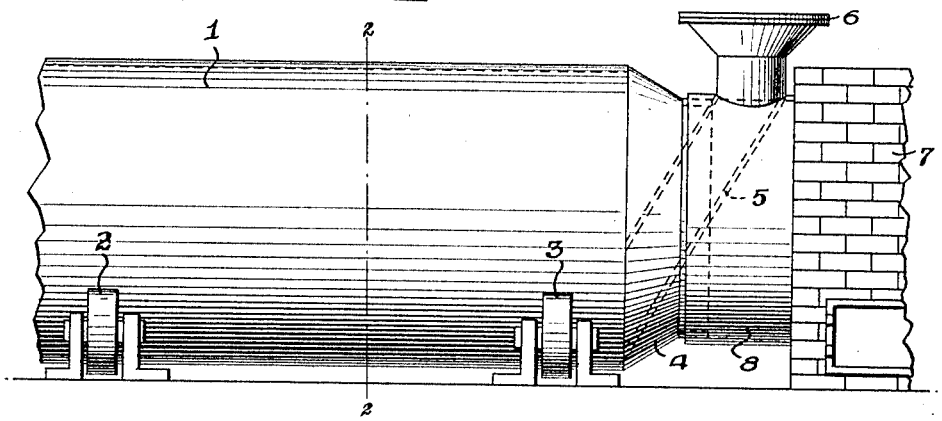
Figure 2:
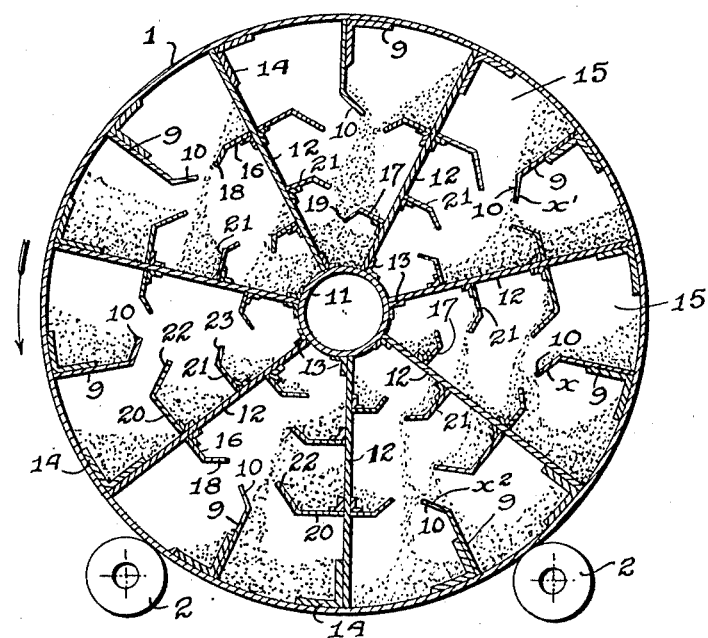

In the drawings:—Figure 1 is a view in elevation, illustrating an apparatus embodying my invention. Fig. 2 is a vertical sectional view taken on line 2—2 of Fig. 1.

Like numerals of reference designate similar parts throughout the different figures of the drawing.

As illustrated, the invention includes a shell or drum 1, preferably cylindrical, which may be rotatably mounted upon wheels 2 and 3, disposed on opposite sides of the center of said drum. The drum may be provided with a conical end 4 into which a charging hopper 5, with an inlet 6, may be arranged to deliver the substance thereto. A suitable source for supply of heat may be in the form of a furnace 7 arranged to deliver to said drum through a tube 8.

The drum or casing 1 is provided with a plurality of peripherally disposed and inwardly radially extending shelves 9 which may be provided with angularly disposed extensions 10. The angular disposition of the extensions 10 is in a direction reverse to the direction of rotation, preferably, so the said extensions 10 may act as inclined discharging portions when the same are in the positions shown at $x$ and $x'$, said extensions acting as deflecting portions when in the position shown in $x^2$. A chamber is formed in the drum by an axially disposed member which may be in the form of a tube
11. As shown, the tube 11 and the drum 1 are connected by radial partitions 12 forming a centrally disposed structure which extends from the tube 11 to the casing 12 and which may, in the form shown, be imperforate. As illustrated, the partitions 12 are connected with the tube 11 by angle irons 13, and angle irons 14 connect said partitions with the casing 1. Said partitions subdivide the chamber formed by the casing 1 into secondary chambers 15 which may extend throughout the length of said casing, in accordance with the length of the partition 12. The drying medium may be discharged into the chambers 15 and also into the tube 11 so that all of the surface portions of the interior of the casing 1 will be rendered effective as drying means. Each partition 12 is provided with a plurality of intercepting abutments the purpose of which is to intercept the substance falling from the shelves 9 and deflect the course thereof so as to expose all portions to the drying action of the heat medium passing through said chamber.

On one side of each partition 12 two relatively short abutments 16 and 17 are secured and each of these abutments is provided with terminal portions, preferably inclined, as at 18 and 19, so that when they are in a lowermost position they act as collecting portions and, when in the uppermost positions, as deflecting or discharging portions. The abutments 16 and 17, which are relatively short, extend toward the planes of the shelves 9 and are located rearwardly of the shelves 9 with respect to the direction of rotation of the drums.

On the partition 12, and located forward of the shelves 9, with respect to the direction of rotation of the drum 1, are relatively long abutments 20 and 21. Each of the abutments 20 and 21 is provided with a terminal portion which is preferably inclined, as indicated at 22 and 23. The inclination of the terminals 22 and 23, is radially inwardly, so that the same form collecting portions when the abutments are in their lowermost positions and form deflecting and discharge portions when said abutments are in an uppermost position.

It will be seen by reference to Fig. 2, that during rotation of the drum 1, the substance in each chamber 15 will be thoroughly scattered about and displaced from one or the outer portion of the chamber toward the inner portion, and vice versa, and also intercepted during its radial passage from one portion to the other of said chamber.

I claim—

1. A drying apparatus comprising in combination, a revoluble casing provided with peripherally disposed shelves carried by and projecting from said casing to elevate and then drop the material, a tube centrally disposed in said casing, and abutments for intercepting the material spaced at different radial points between said tube and said shelves.

2. A drying apparatus comprising in combination, a revoluble casing provided with a plurality of peripherally disposed shelves carried by and projecting from said casing to elevate and then drop the material, a tube in said casing, and partitions extending from said tube to said casing and dividing the same into chambers, substantially as described.

3. A drying apparatus comprising in combination, a revoluble casing provided with a plurality of peripherally disposed shelves carried by and projecting from said casing to elevate and then drop the material, a tube centrally disposed in said casing, partitions extending from the said tube to said casing and dividing the same into a plurality of chambers, and a plurality of abutments extending from said partitions and disposed at different radial points with respect to said shelves, substantially as described.

In testimony whereof I affix my signature in presence of two witnesses.

WALTHER LIERFELD. [L. S.]

Witnesses:
ALBERT NUFER,
HELEN NUFER.

---

Copies of this patent may be obtained for five cents each, by addressing the "Commissioner of Patents, Washington, D. C."